Patented Sept. 29, 1942

2,297,557

UNITED STATES PATENT OFFICE 2,297,557

FUNGICIDAL DERIVATIVES OF ACETANTHRANILIC ACID

William F. Hester, Drexel Hill, and W E Craig, Philadelphia, Pa., assignors to Rohm & Haas Company, Philadelphia, Pa.

No Drawing. Application August 1, 1941
Serial No. 404,970

5 Claims. (Cl. 167—30)

This invention relates to fungicidal compositions containing as the active fungicidal agent acetanthranilic acid or one of its salts, particularly its copper salt.

It has been found that acetanthranilic acid and its salts possess fungicidal value. When an acetanthranilate is prepared from a metal of known fungicidal action, the resulting compound is found to have exceptional value against various types of fungi. For example, whereas the usual copper spray is effective only in preventing powdery mildew, copper acetanthranilate actually desrtoys powdery mildew. But the fungicidal value is not confined to copper or mercury salts. The acid itself, its soluble salts, such as the ammonium, sodium, potassium, or amine salts, and its insoluble salts, such as the iron, barium, calcium, strontium, cadmium, zinc, silver, etc. salts have also been found definitely effective. These compounds are of particular value on plants which are sensitive to copper and on which, therefore, the common fungicidal sprays are not safely applied.

The acetanthranilates may be applied from solutions, suspensions, or dusts with or without wetting or spreading agents. They may be used in conjunction with insecticides and other fungicides.

Acetanthranilic acid may be prepared from anthranilic acid by reaction with acetic anhydride. The reaction product may then be separated by addition of water and filtration. By way of specific example, 411 parts of anthranilic acid may be reacted with an excess of acetic anhydride. When the reaction mixture is diluted with water, a white solid separates which is removed and washed. This may be used as such or it may be converted to its sodium salt. For the above quantity of acid, a solution of 130 parts of sodium hydroxide in 2000 parts of water dissolves the crude acetanthranilic acid. The acid may be reprecipitated upon the addition of a strong acid, such as hydrochloric, filtered, washed, and dried. A product thus purified melts at 185° C. For conversion to other salts the acid is converted to the soluble sodium salt. Other salts are then formed by double decomposition. Addition of a solution of copper sulfate precipitates the copper salt of acetanthranilic acid. Similarly, a ferric chloride solution may be added to a solution of sodium acetanthranilate to precipitate the iron salt.

In tests on snapdragons powdery mildew was controlled with sprays containing acetanthranilic acid at 2 lbs. per 100 gallons. Powdery mildew on roses was controlled with sprays containing 0.5 and 1 lb. respectively of copper acetanthranilate per 100 gallons of spray. Tests over a two year period showed no damage to the rose plants. The barium and iron salts were less active than the copper salt, as might be expected, but they were definitely effective fungicidally.

For the prevention of damping-off, pea seeds were dusted with 0.25% by weight of various acetanthranilates and then tested by the "rag doll" method. For comparison, a standard cuprous preparation was also applied. From 100 pea seeds thus treated 62 sprouted. From 100 seeds dusted with acetanthranilic acid 83 sprouted, from 100 seeds carrying copper acetanthranilate 74, and from 100 seeds carrying ferric acetanthranilate 89.

We claim:

1. A fungicidal composition containing as an active fungicidal agent an acetanthranilate selected from a member of the class consisting of acetanthranilic acid and salts of acetanthranilic acid.

2. A fungicidal composition containing as an active fungicidal agent copper acetanthranilate.

3. A method of controlling powdery mildew on plants which comprises applying to plants infested with said mildew an acetanthranilate selected from a member of the class consisting of acetanthranilic acid and salts of acetanthranilic acid.

4. A method of controlling powdery mildew on plants which comprises applying to plants infested with said mildew copper acetanthranilate.

5. As a new composition of matter, copper acetanthranilate.

WILLIAM F. HESTER.
W E CRAIG.